United States Patent
Lee et al.

(10) Patent No.: US 7,738,464 B2
(45) Date of Patent: Jun. 15, 2010

(54) METHOD FOR PROVIDING SERVICE BASED ON SERVICE QUALITY AND AN ACCOUNTING METHOD IN A MOBILE COMMUNICATION SYSTEM

(75) Inventors: Sung-Won Lee, Songnam-shi (KR); Dong-Soo Park, Seoul (KR); Jin-Sung Cho, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1581 days.

(21) Appl. No.: 10/497,862

(22) PCT Filed: Dec. 6, 2002

(86) PCT No.: PCT/KR02/02303

§ 371 (c)(1),
(2), (4) Date: Oct. 29, 2004

(87) PCT Pub. No.: WO03/049468

PCT Pub. Date: Jun. 12, 2003

(65) Prior Publication Data

US 2005/0055220 A1    Mar. 10, 2005

(30) Foreign Application Priority Data

Dec. 6, 2001    (KR) .................. 10-2001-0077126

(51) Int. Cl.
*H04L 12/28* (2006.01)

(52) U.S. Cl. .................. 370/395.21; 455/432.3
(58) Field of Classification Search .................. None
See application file for complete search history.

(56) References Cited

U.S. PATENT DOCUMENTS

| | | | |
|---|---|---|---|
| 6,854,014 B1 * | 2/2005 | Amin et al. .................. | 709/227 |
| 7,225,238 B1 * | 5/2007 | Dantu et al. .................. | 709/219 |
| 2002/0032800 A1 * | 3/2002 | Puuskari et al. .............. | 709/246 |
| 2002/0147828 A1 * | 10/2002 | Chen et al. .................. | 709/231 |

FOREIGN PATENT DOCUMENTS

CN    1271488 A    10/2000

(Continued)

*Primary Examiner*—Chirag G Shah
*Assistant Examiner*—Otis L Thompson, Jr.
(74) *Attorney, Agent, or Firm*—Roylance, Abrams, Berdo & Goodman, L.L.P.

(57) ABSTRACT

Disclosed is a method for providing a service to MS (Mobile Station) according to a service quality in a service system including MS, BTS (Base Transceiver System) that can communicate with the MS, and a profile server for storing service quality profile information for the MS. The profile server comprises storing identification information indicating a user of the MS along with service quality profiles for the services that can be provided to the MS; and upon receipt of an MS information request from the BTS scheduled to service the MS, providing service quality profiles for the MS to the BTS, and providing a service required by the MS according to a service quality profile for the service.

17 Claims, 14 Drawing Sheets

FOREIGN PATENT DOCUMENTS

| | | | |
|---|---|---|---|
| EP | 01303317.0 | * | 4/2001 |
| JP | 02-152335 | | 6/1990 |
| JP | 06-315033 | | 11/1994 |
| JP | 09-018930 | | 1/1997 |
| JP | 09-321795 | | 12/1997 |
| JP | 2000-253144 | | 9/2000 |
| JP | 2000-332750 | | 11/2000 |
| JP | 2001-016647 | | 1/2001 |
| JP | 2001-144856 | | 5/2001 |
| JP | 2001-177865 | | 6/2001 |
| JP | 2001-217836 | | 8/2001 |
| JP | 2001-257675 | | 9/2001 |
| JP | 2001-298484 | | 10/2001 |
| JP | 2001-127756 | | 5/2002 |
| WO | 99/05828 | | 2/1999 |
| WO | 99/48310 | | 9/1999 |
| WO | 00/10357 | | 2/2000 |
| WO | WO 00/38391 | | 6/2000 |
| WO | WO 00/72572 | | 11/2000 |
| WO | WO 01/58054 | | 8/2001 |

* cited by examiner

METHOD FOR PROVIDING SERVICE BASED ON SERVICE QUALITY AND AN ACCOUNTING METHOD IN A MOBILE COMMUNICATION SYSTEM

This application is a 371 if PCT/KR02/02303 Dec. 06, 2002.

BACKGROUND OF THE INVENTION

1. Field of the Invention

The present invention relates to a method for managing profiles in a mobile communication system, and more particularly to a method for managing profiles according to a type of service provided in a mobile communication system.

2. Description of the Related Art

Typically, billing performed in the communication system is different according to call duration time, time zone of the call duration time, area providing service within the time zone of the call duration time, telephone number of an originator, quantity of data providing service, type of service and so forth. Information on such services must be stored to perform correct billing to each subscriber to whom such services are rendered. Thus, description will be made below regarding how billing information is stored in the mobile communication system, as one example.

FIG. 1 shows a network construction for a general mobile communication system, in which various systems for storing charging information are connected with each other.

A plurality of base transceiver systems (BTSs) BTS-a to BTS-n or 10-a to 10-n perform communication with at least one mobile station (MS) located within their own areas through wireless channels. For instance, the BTS-a communicates with the mobile station 1. Further, the base transceiver systems are connected to a base station controller (BSC) 20. The BSC 20 is connected to any one network 60 selected from an Internet, a public switched telephone network (PSTN) and a public switched data network (PSDN) by means of a gateway (GW) 30 or a mobile switching center (MSC). In addition, information on subscribers or service profiles for subscribers is generally stored at a profile server 40. In the mobile communication system such as CDMA2000 1x, the profile server can be implemented as an authentication authorization and accounting (AAA) server or MSC. In the mobile communication system such as CDMA2000 1xEV-DO or CDMA2000 1xEV-D, the profile server can be implemented as all access network (AN) AAA server or the AAA server, or be incorporated into the MSC, or be implemented as another independent equipment. Also, an accounting server 50 for managing information on subscribers or information on billing related to services provided to subscribers can be to implemented as any one of the foregoing equipments. In FIG. 1, the profile server 40 and the accounting server 50 are configured to be connected with each other by means of the GW 30. However, when the accounting server 50 is used as the AN AAA server or the AAA server in reality, the profile server 40 may be either incorporated into the accounting server 50 or indirectly connected to the accounting server 50 by means of another piece of equipment. That is, when the BTSs 10-a to 10-n or BSC 20 are/is connected to the profile server 40, the profile server 40 is connected to the accounting server 50 through the GW 30, so that the accounting server 50 can get information on quality of service (QoS) stored at the profile server 40.

Even if not described herein, an IP network may be employed to connect either between the BTSs and the BSC or between the BSC and the GW. This IP network may be constructed to allow the operation performed by any one of the BTS, BSC, GW and so forth, to be done by another piece of equipment. Therefore, in the IP network, other operation and resulting information transmission as described below have only to be performed.

To this end, a subscriber profile managed by the profile server 40 may be represented as Table 1 as follows:

TABLE 1

| User name | Password | User information |
|---|---|---|

As can seen from Table 1, the subscriber profile is comprised of a user (or subscriber) name or identifier, a password allocated to each user and additional user information. There are two approaches for storing the subscriber profile as represented in Table 1, one for inputting it directly at the profile server 40 and the other for inputting it through another piece of equipment such as an mobile station at a remote location. In the subscriber profile as given in Table 1, both the subscriber name and the password for authenticating the subscriber name are inputted to obtain access to data for the subscriber profile, and then the subscriber profile can be either stored or updated.

A procedure performing authentication by means of the subscriber profile will be described below with reference to FIG. 1. First, when the MS 1 sets up a call, the MS 1 causes user login data stored in advance to be formed into data for transmitting through a wireless channel and then transmits the formed data to the corresponding BTS-a. The user login data include the user name and password. The BTS-a transmits the received user login data to the MSC or GW 30 through the BSC 20.

Hereinafter, description will be made on the assumption that the login data are received at the GW 30. When the GW 30 receives the login data containing the user name and password as mentioned above, the GW 30 creates an access request message (MSG) containing the received data and then transmits the generated access request MSG to the profile server 40. Then, the profile server 40 checks whether or not the user is authenticated on the basis on the transmitted data. As a result of checking, if authentication is acceptable or successful, the profile server 40 creates an access response MSG and then transmits the generated access response MSG to the GW 30 again. In this case, the GW 30 and profile server 40 generally make use of a protocol called DIAMETER or RADIUS. Both the access request MSG and the access response MSG are based on RADIUS.

On completing the authentication, a type of service demanded from the MS 1 is provided. Then, when call disconnection is demanded from the MS 1, a procedure for performing a logout and for transmitting billing information to the accounting server 50 is carried out. Hereinafter, this procedure will be described in detail. When provision of demanded service is completed, the MS 1 transmits a disconnection message for a logout to the BTS-a. As a result, the BTS-a transmits the disconnection message to the BSC 20. When the BSC 20 receives the disconnection message, the BSC 20 originates the disconnection message containing a connection time when the service is provided and then transmits the originated disconnection message to the GW 30. The GW 30 performs a procedure for a logout from the profile server 40 with respect to the MS 1, and simultaneously transmits a billing or charging message to the accounting server 50. Here, the billing message transmitted to the accounting server 50 includes information both on the connection the and on the number of packets. This billing message is generally collected when the call is disconnected.

That is to say, in general, billing is performed on the basis of a time when a subscriber makes use of provided services and of the number of packets which the subscriber transmits and receives for the time. Therefore, the accounting server 50 has a billing database provided with an identifier field for identifying a subscriber and with a subscriber billing information field for storing basic billing information on the subscriber.

Meanwhile, as it is possible to provide a data service in the mobile communication system, subscribers expect assurance of a higher quality with respect to the data service. In other words. QoS (quality of service) is differently demanded according to a provided service type or a subscriber type. For this reason, mobile communication systems have undergone much development to satisfy the demand. In this manner, when there are provided differentiated services according to QoS, the aforementioned conventional approaches encounter difficulty in performing billing according to QoS.

SUMMARY OF THE INVENTION

Accordingly, the present invention has been made to solve the above-mentioned problems occurring in the prior art, and an object of the present invention is to provide a method for providing services according to quality of service and a method for generating and storing billing data according to the provided services.

It is another object of the present invention to provide a method for performing precise billing with respect to provided services.

In order to accomplish the aforementioned objects, according to one embodiment of the present, there is provided a method for providing services to at least one mobile station (MS) according to quality of service (QoS) in a mobile communication system, in which the mobile communication system includes the MS, at least one base transceiver system (BTS) and a profile server for storing QoS profile information of the MS, the method comprising the steps of: causing the profile server to store identifier information indicating a user of the MS and QoS profiles of each service which can be provided to the MS together with the identifier information: and causing the profile server to transmit the QoS profiles of the MS to the BTS and to provide each service according to the QoS profiles.

In order to accomplish the aforementioned objects, according to another embodiment of the present, there is provided a method for performing billing and for storing billing information according to services provided to at least one mobile station (MS) according to quality of service (QoS) in a service system, in which the service system comprises the MS, at least one base transceiver system (BTS) capable of providing the services to the MS with the QoS differentiated, a base station controller (BSC) connected with the BTS, a gateway (GW) connected with the BSC, and an accounting server connected with the GW and storing the billing information depending on the services provided to the MS and performing billing calculation, the method comprising the steps of: causing the BTS to create a first call disconnect message (MSG) containing QoS billing information provided to the MS when the BTS receives the first call disconnect MSG from the MS which is provided with the services according to QoS, and to transmit the first call disconnect MSG to the BSC; causing the BSC to create a second call disconnect MSG which further contains a call connection time of the MS and to transmit the second call disconnect MSG to the GW; causing the GW to create a billing request MSG containing the QoS billing information provided to the MS, the call connection time provided with the services and the number of packets provided to the MS, and to transmit the generated billing request MSG to the accounting server; and causing the accounting server to store information needed for performing the billing when the billing request MSG is received and to perform the billing with respect to services provided when information according to the QoS is added.

In order to accomplish the aforementioned objects, according to yet another embodiment of the present, there is provided a method for providing services to at least one mobile station (MS) according to quality of service (QoS) to storing billing information depending on provided services in a service system, in which the service system comprises the MS, at least one base transceiver system (BTS) capable of communicating with the MS, a base station controller (BSC) connected with the BTS, a gateway (GW) connected with the BSC, a profile server connected with the GW and storing QoS profile information of the MS, and an accounting server connected with the GW and storing the billing information depending on the services provided to the MS and performing billing calculation, the method comprising the steps of: causing the profile server to store identifier information indicating a user of the MS and QoS profiles of each service which can be provided to the MS together with the identifier information; causing the MS to provide the QoS profiles of the MS to the BTS when information on the MS is requested from the BTS and provide services requested by the MS according to the QoS profiles associated with the services: causing the BTS to create a first call disconnect message (MSG) containing QoS billing information provided to the MS when the BTS receives the first call disconnect MSG from the MS which is provided with the services according to QoS, and to transmit the first call disconnect MSG to the BSC; causing the BSC to create a second call disconnect MSG which further contains a call connection time of the MS and to transmit the second call disconnect MSG to the GW; causing the GW to create a billing request MSG containing the QoS billing information provided to the MS, the call connection time provided with the services and the number of packets provided to the MS, and to transmit the generated billing request MSG to the accounting server; and causing the accounting server to store information needed for performing the billing when the billing request MSG is received and to perform the billing with respect to services provided when information according to the QoS is added.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings.

Figure 1:
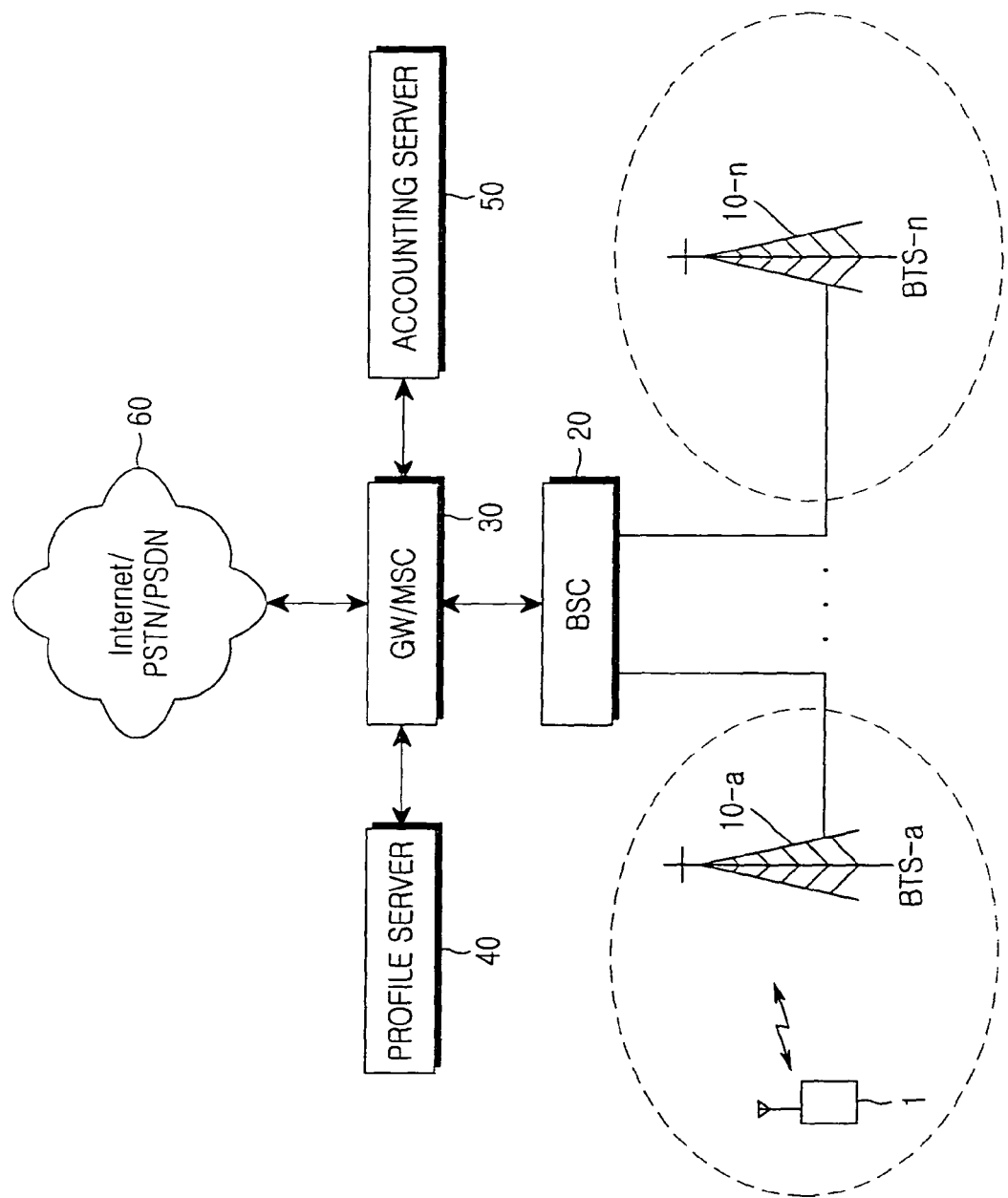
FIG. 1 shows a network structure for a general mobile communication system, in which systems for storing billing information are connected with each other.

Both a mobile communication system which the present invention takes into consideration and connection between systems for performing billing are similar to those shown in FIG. 1 representing the prior art. Therefore, a type of system may be varied according to a type of network, as mentioned in the prior art.

Figure 2:
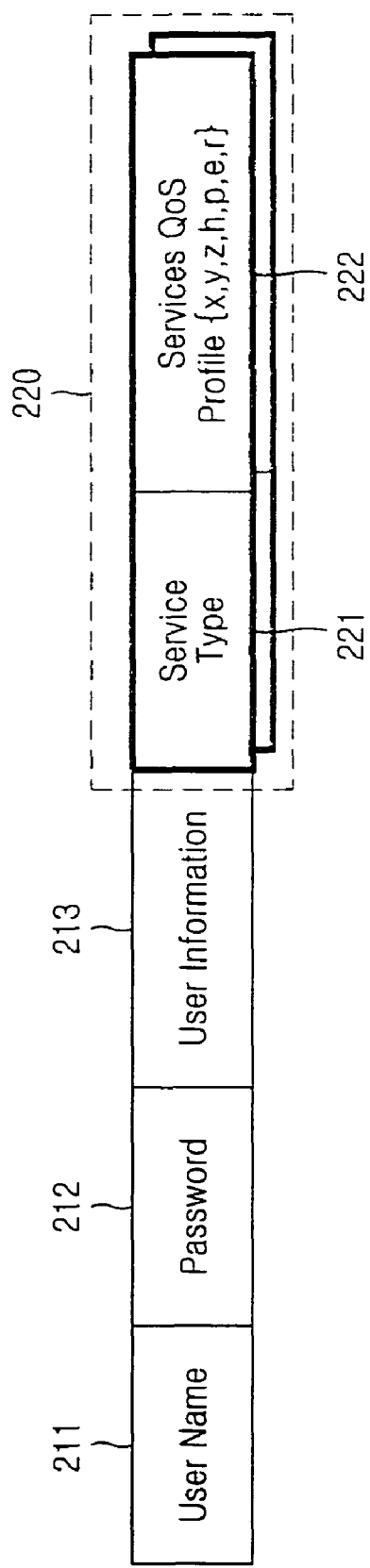
FIG. 2 shows an structure of a database stored at a profile server according to a first preferred embodiment of the present invention.

FIG. 2 shows an structure of a database stored at a profile server according to a first preferred embodiment of the present invention. Hereinafter, a detailed description will be made regarding the database stored at the profile server 40 with reference to FIG. 2.

The database stored at the profile server 40 includes a user name field 211 for identifying a plurality of users or subscribers, a password field 212 for performing authentication to a plurality of subscribers, an additional user information field 213, and a quality-of-service (QoS) profile 220 according to the invention. That is to say, the present invention further comprises the QoS profile 220, in addition to the user name field 211, the password field 212 and the additional user information field 213 which have the same structure as the prior art. The QoS profile 220 can be implemented by two approaches. One approach can define the QoS profile 220 in such a manner that a single QoS profile is allocated to each subscriber. Here, each subscriber is able to have a single profile alone. The other approach can construct the QoS profile 220 in such a manner that at least two QoS profiles are allocated to each subscriber according to at least two services which the subscriber can make use of. Here, each user can be provided with two QoS profiles or more. In other words, each user is able to have the QoS profile 220 as many as the number of services which he/her can make use of. FIG. 2 shows the latter as example.

Thus, when a plurality of users or subscribers is allocated by at least one QoS profile, a service provider is able to divide the or subscribers into a plurality of predetermined groups and then to provide desired services to each group of or subscribers. The subscribers can be classified according to provided service, which can be exemplified as follows:

(1) Premium class subscriber,
(2) Gold class subscriber,
(3) Silver class subscriber, and
(4) Bronze class subscriber.

The QoS profile 220 can be stored as the user information on each subscriber classified as mentioned above. The classified subscribers can be also divided according to billing level. To be more specific, the higher class the subscribers belong to, the higher the billing level becomes. By contrast with this, the lower class the subscribers belong to, the lower the billing level becomes. The profile server 40 can include different QoS profiles according to the number of services which are provided to each subscriber. Therefore, each subscriber can be provided with different service according to each QoS profile. Alternatively, the provided services may be divided into various types according to the class of subscribers; that is, the types of provided services may be divided according to the class of subscribers without differentiating types of services provided by the QoS profiles. These types of services having different QoSes can be represented below as Table 2.

TABLE 2

| Type of service | Parameter |
| --- | --- |
| Legacy voice service | Voice QoS parameter |
| Video on Demand (VoD) service | VoD level QoS parameter |
| Music on Demand (MoD) service | MoD level QoS parameter |
| Instant message service | Instant message QoS parameter |
| Wireless ISP service | Wireless ISP level QoS parameter |
| Internet service | Internet QoS parameter |
| VoIP service | VoIP level QoS parameter |
| ... | ... |

The types of services, which are stored in the profile server 40, may be listed as shown in Table 2. Further, the listed services can be differently matched with each user. Of the service types, the Legacy voice service has only one QoS parameter. Examples of services having this one QoS parameter are the instant message service, Internet service and so forth. Examples of services having at least one QoS parameter are the VoD service, MoD service, Wireless ISP service, VoIP service and so forth. Each of the QoS parameters has different value according to a level. Specifically, even in the same type of services, e.g., in the same VoD services, their QoS parameters have different values owing to different levels. Therefore, the VoD services can be provided according to each different QoS suitable to each QoS parameter. Consequently, even the same type of services can be provided with each different QoS, and thus differentiated billing can be performed. When this is mapped with, for instance, the classes of subscribers, the resultant construction can be described as follows.

For a Premium class subscriber, all available services, such as Voice, VoD, MoD, web surfing, file transfer and so forth are provided, while for a Bronze class subscriber, some available services, such as voice, web surfing and so forth are provided. Here, even though it is possible to provide the same services, the QoSes for each service may be differentiated at different levels. That is, the QoS parameters have different levels according to the class of subscribers. To be more specific, in case that the QoS parameters have different levels, assuming that the Premium class subscriber has a level 1 value for a QoS parameter for a web surfing service and the Bronze class subscriber has a level 2 value for a QoS parameter for a web surfing service, it can be constructed that subscribers of level 1 are guaranteed a minimal data transfer rate of 100 Kbps and subscribers of level 2 are guaranteed a data transfer rate of 10 Kbps. That is, the QoS parameters can be defined to support different QoS for the same services according to difference of charge.

Alternatively, the QoS parameters may be defined to allow subscribers to choose types of available services and QoS requirements for each service depending on their tastes without differentiating the classes of subscribers.

Thus, the parameters of the QoS profile can be defined as follows:

(1) x: minimal number of bits which service can transfer for a predetermined time, (2) y: predetermined time or period which it takes to transfer the minimal number of bits, (3) z: maximal number of bits which service can transfer for a predetermined time, (4) h: handoff mode of service, such as soft, virtual-soft, fast-virtual-soft and so forth, (5) p: processing mode when it is impossible to support service, such as drop, low-QoS, non-QoS and so forth, (6) e: definition on whether or not preemption of low-level QoS is rendered when it is impossible to support service, and (7) r: priority of service.

These parameters of the QoS profile are stored at the database of the profile server 40 of FIG. 1.

Figure 3:
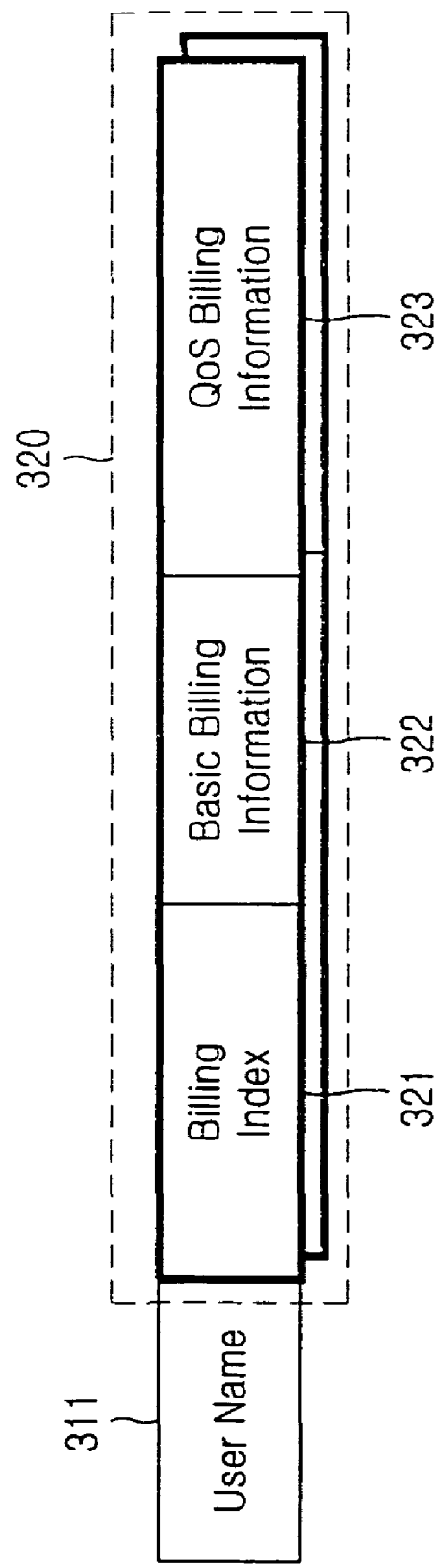
FIG. 3 shows an structure of a database of an accounting server according to a first preferred embodiment of the present invention.

An structure of a database of the accounting server 50 according to the present invention will be reviewed with reference to FIG. 3. FIG. 3 shows an structure of a database of the accounting server 50 according to the preferred embodiment of the present invention.

Referring to the structure of the database stored at the accounting server 50 according to the present invention, the database is made up of a user name field 311 and a record 320 indicating service billing information on service which a subscriber makes use of. The record 320 includes a billing index field 321 for identifying a record of billing details, a basic billing information field 322 for storing basic billing information on the corresponding billing index, and a QoS billing information field 323 for storing billing information according to QoS. At the QoS billing information field 323, various types of data can be stored as follows:

(1) time scale of guaranteeing QoS during connection duration, (2) time scale of not guaranteeing QoS during connection duration, (3) profile of a data transfer rate (or average data transfer rate) for the time when QoS is guaranteed, (4) profile of a data transfer rate (or average data transfer rate) for the time when QoS is not guaranteed, and (5) profile of a physical channel rate during connection duration.

Figure 4:
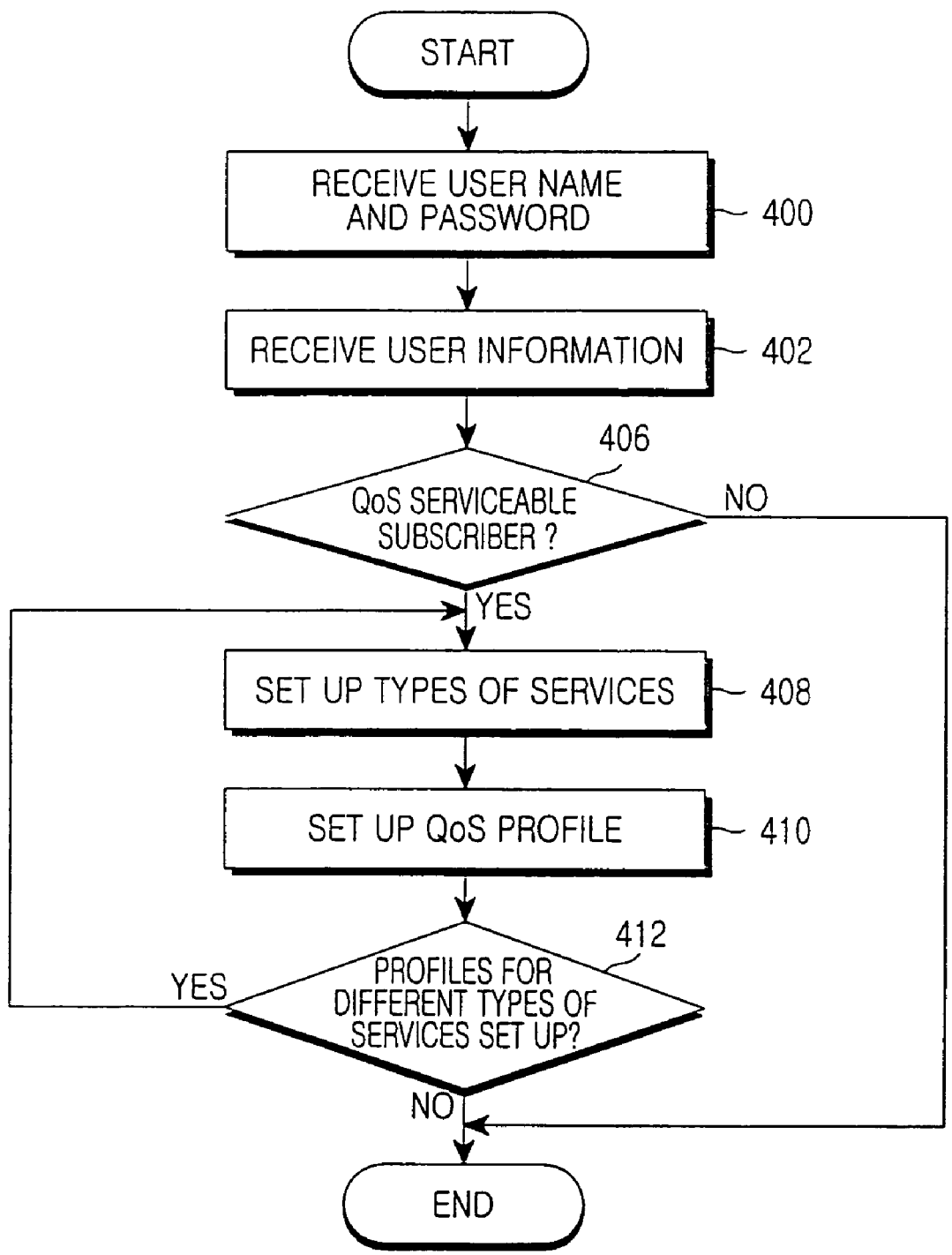
FIG. 4 is a control flow-chart when a subscriber profile is stored at a profile server according to a first preferred embodiment of the present invention.

FIG. 4 is a control flow-chart when a subscriber profile is stored at a profile server according to a first preferred embodiment of the present invention. A detailed description will be made below with respect to a control procedure when the subscriber profile is stored at the profile server according to the present invention with reference to FIGS. 2 and 4.

As one example of the control procedure shown in FIG. 4, a procedure for directly storing a profile database at the profile server 40 is described, but it is natural that a procedure for storing a profile database at a remote location is also possible.

On demanding to input a user profile, the profile server 40 receives a user name and a password which are inputted by an operator (Step 400). This is to create the user name field 211 and the password field 212 as shown in FIG. 2. And the profile server 40 receives information on a user (Step 402), thereby the user information field 213 as shown in FIG. 2 is generated. Subsequently, the profile server 40 inquires of the operator about whether or not the user is a QoS serviceable one, i.e., one who may be provided with services according to QoS. This is to check whether or not generating the QoS information profile 220 as shown in FIG. 2. If a signal inputted by the operator, which functions as a signal of response to the inquiry, corresponds to the QoS serviceable user, the profile server 40 proceeds to Step 408. If not so, the profile server 40 creates the user profile using the received user name, password and user information, and then terminates a routine for generating the database.

When proceeding from Step 406 to Step 408, the profile server 40 sets up types of services by means of data inputted by the operator. These types of services may be classified into four classes as exemplified above. However, these types of services are only given as a first preferred embodiment. Therefore, when they are classified into different classes, they can be set up to be suitable for such differently classified classes. The profile server 40 sets up a QoS profile by means of data inputted by the operator (Step 410). Subsequently, the profile server 40 checks whether or not profiles for different types of services exist (Step 412). If profiles for different types of services exist, the profile server returns to Step 408 and repeats the aforementioned procedures. If not so, the profile server brings the routine to end. These service profiles may includes types of services as listed in Table 2 and a service level value for each service. Therefore, the QoS profile of each user is stored with each type of service and a value of the QoS parameter for the each type of service. That is, as for a particular subscriber, types of services as many as the number of provided QoS services are stored in a record type together with values of the QoS parameters associated with the services. The types of services refer to a kind of service supporting the QoS, which can be defined as follows:

(1) Service type No. 1: Voice, (2) Service type No. 2: VoD (video on demand), (3) Service type No. 3: File transfer, (4) Service type No. 4: MoD (music on demand), (5) Service type No. 5: Web surfing, and (6) Others Further, the QoS parameters are stored for each service as values of {x, y, z, h, p, e, r} as defined above.

Subsequently, when the subscriber performs a call set-up and the resulting services begin to be provided, a signalling procedure for information transfer will be described.

Figure 5:
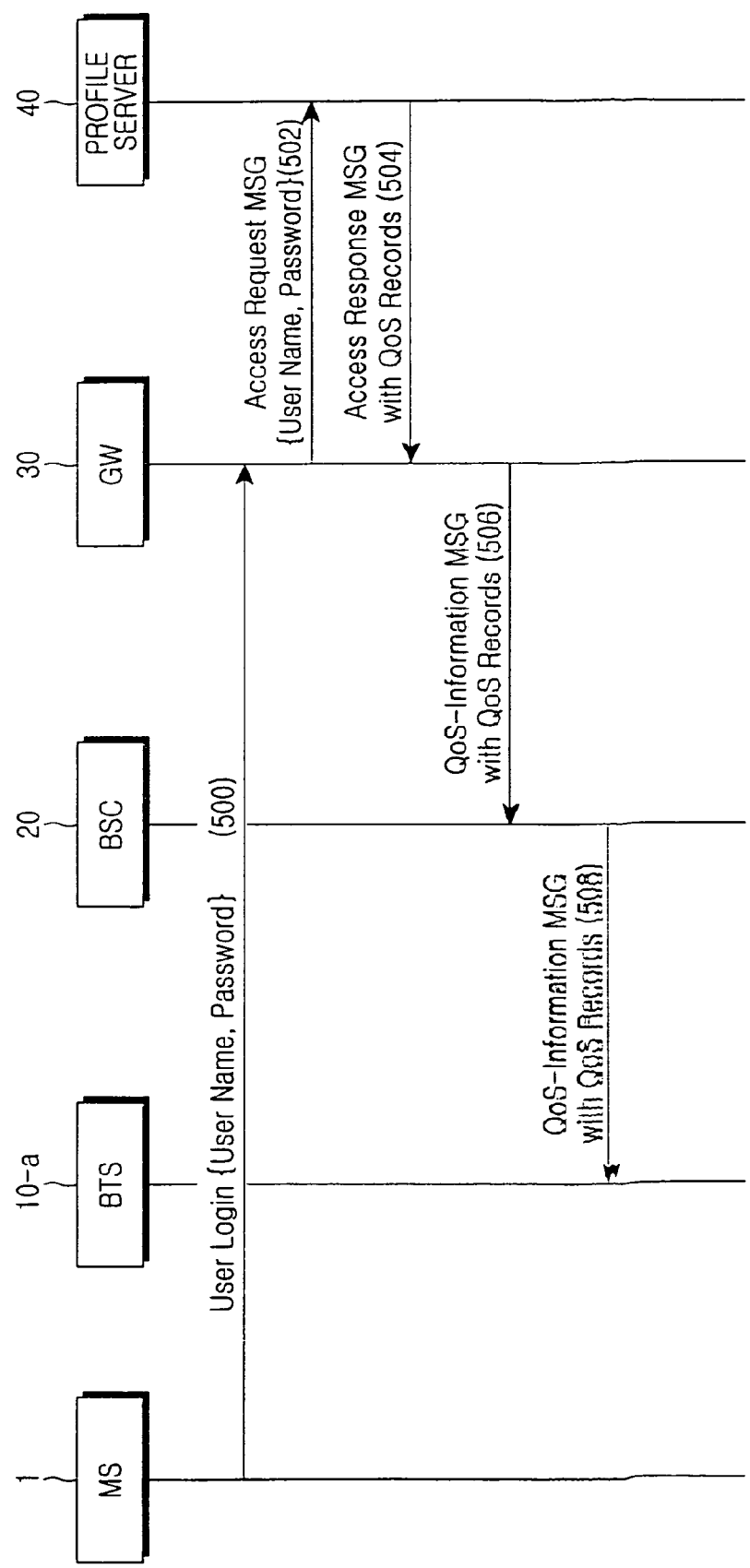
FIG. 5 is a signal flow diagram of a signalling procedure for service authentication when a call is set up according to a first preferred embodiment of the present invention.

FIG. 5 is a signal flow diagram of a signalling procedure for service authentication when a call is set up according to a first preferred embodiment of the present invention. A detailed description will be made below regarding signal flow of the signalling procedure when a call is set up according to the present invention with reference to FIG. 5.

The MS 1 transmits a user login signal to the GW 30 (Step 500). The user login signal includes a user name and a password. Here, the user login signal is transmitted through a wireless channel between the MS 1 and BTS-a, but through a wire channel between BTS-a and BSC 20 and the GW 30. Then, when the GW 30 receives the user login signal, the GW 30 sends an access request message to the profile server 40 (Step 502). This access request MSG contains the user name and password, both of which are received from the MS 1.

The profile server 40 examines the received user name and password by means of the user name field 211 and the password field 212 of the data profile as shown in FIG. 2 so as to check whether or not user authentication can be accepted. Then, the profile server 40 transmits the checked result to the GW 30 as the access response MSG (Step 504). If the subscriber is acceptable, the profile server transmits data of the QoS record field 220 together. That is, types of services of the subscriber and data of the service QoS profile are transmitted to the GW 30. When the message transmitted from the profile server 40 to the GW 30 makes use of RADIUS, information of the QoS record fields is transmitted by using an attribute field. In the embodiment of FIG. 5, description is made in detail with respect to acceptable authentication. Therefore, it will be easy for one skilled in the art to understand a case of unacceptable authentication. For this reason, description on the unacceptable authentication will not be made in detail.

When the GW 30 receives the access response MSG, the GW transmits the access response MSG to the BSC 20 as a QoS information MSG containing data of the received QoS record field 220 (Step 506). Subsequently, the BSC stores the QoS record field which is contained in the QoS information MSG and then transmits the QoS information MSG to the BTS-a (Step 508). With the aforementioned procedures, the BTS-a and BSC 20 receives the QoS information MSG and the resultant data of the QoS record field 220, thus allowing for performance of service according to a value of the QoS record. In other words, there is a possibility of performing services based on the QoS.

The QoS information MSG has a structure which may be represented as Table 3.

TABLE 3

| MSG type (code) | Identifier | Length |
|---|---|---|
| Authentication information | | |
| QoS record # 1 | | |
| ... | | |
| QoS record # N | | |

Reviewing Table 3, there are a variety of fields, of which a MSG type field and an identifier field are to identify a message, a length filed is to indicate the length of the message. Further, there are an authentication information field for performing user authentication and QoS record fields for storing QoS parameter records. Each of the QoS record fields may be comprised of at least two fields according to types of provided services. For a basic voice service, the QoS record Field can be comprised of a single field.

Figure 6:
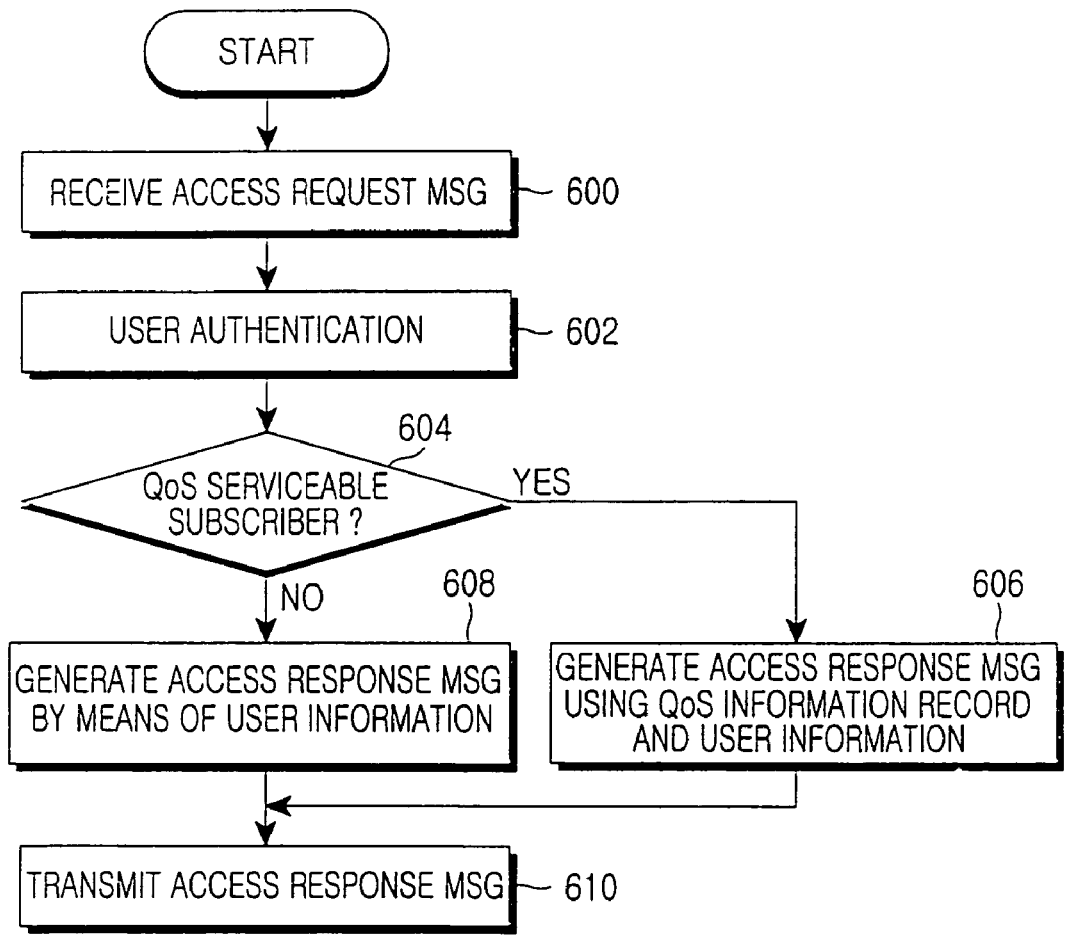
FIG. 6 is a control flow-chart when an access request massage (MSG) is received at a profile server according to a first preferred embodiment of the present invention.

FIG. 6 is a control flow-chart when an access request MSG is received at a profile server according to a first preferred embodiment of the present invention. A detailed description will be made below with reference to FIG. 6, regarding a control procedure for generating and transmitting an access response MSG when the access request MSG is received at the profile server according to the present invention.

When the profile server 40 receives the access request MSG (Step 600), it performs user authentication (Step 602). The user authentication performed at the profile server 40 is carried out by extracting a user name and a password from the received access request MSG, by fetching stored profile data as mentioned above, and by comparing the extracted user name and password with the fetched data. FIG. 6 is given to describe only the case that authentication of the access request MSG is acceptable. For this reason, any description will not be made regarding the case that authentication of the access request MSG is unacceptable. On completing authentication, the profile server 40 checks whether or not a user, to whom acceptable user authentication is given, is a QoS serviceable one (Step 604). If the checked result is turned out to be the QoS serviceable user, the profile server 40 proceeds to Step 606. If not so, the profile server 40 proceeds to Step 608. In Step 606, the profile server 40 creates an access response MSG using a QoS information record and user information and then proceeds to Step 610. Here, the generated access response MSG can be represented as Table 3.

Unlike to the forgoing, in Step 608, the profile server 40 creates an access response MSG using user information. This access response MSG generated through user information in Step 608 becomes the access response MSG which is generally used in the prior art.

When the access response MSG is generated in Step 606 or 608 as mentioned above, the profile server 40 transmits the generated access response MSG to the GW 30 (Step 610).

Figure 7:
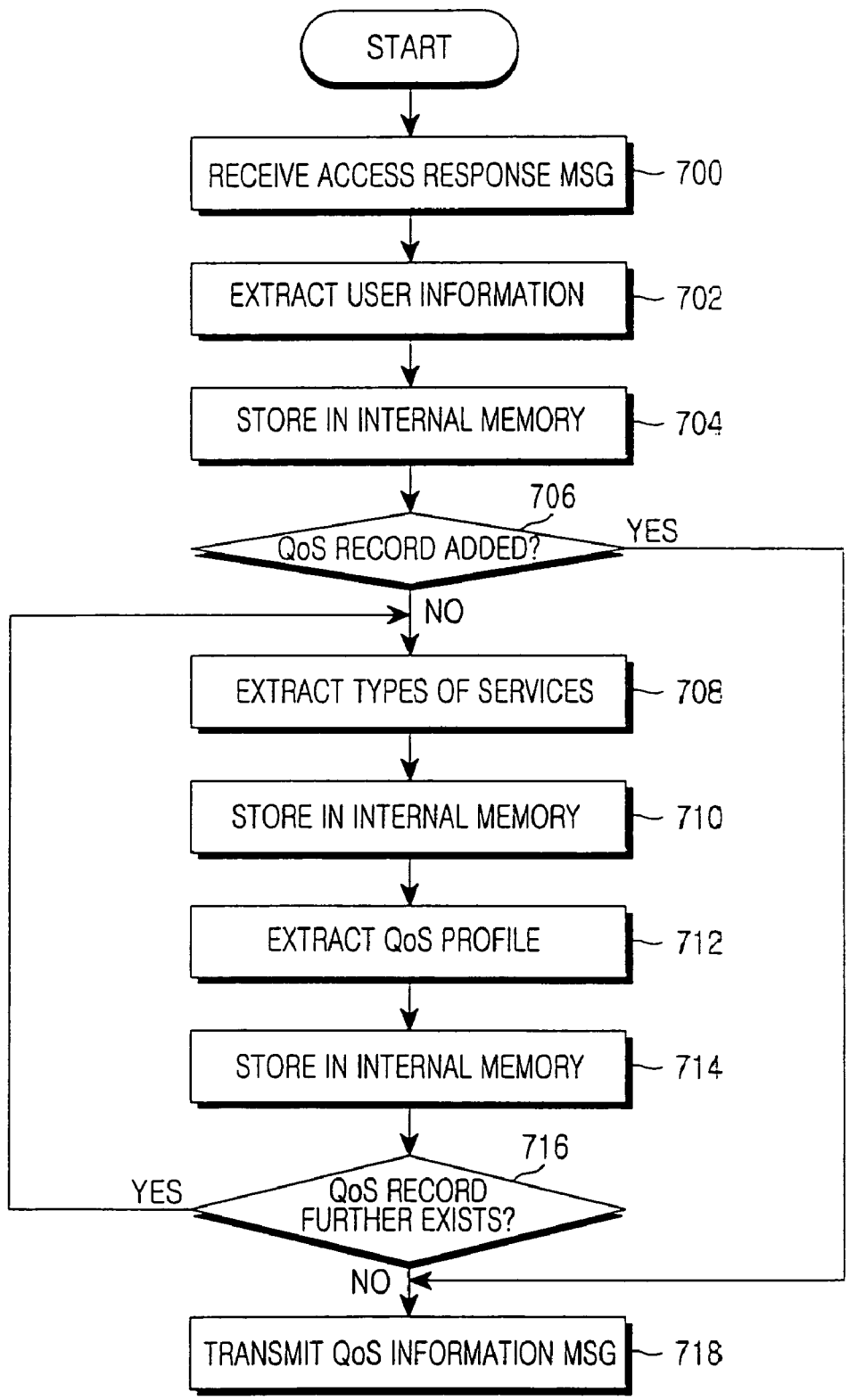
FIG. 7 is a control flow-chart when an access response MSG is received at a gateway (GW) or base station controller (BSC) according to a first preferred embodiment of the present invention.

FIG. 7 is a control flow-chart when an access response MSG is received at a GW or BSC according to a first preferred embodiment of the present invention. A detailed description will be made below with reference to FIG. 7, regarding a control procedure when the access request MSG is received at the GW 30 or BSC 20. Moreover, the description will be made on the assumption that the control procedure of FIG. 7 is performed at the GW 30. There is an operational difference between the BSC 20 and the GW 30 in that messages are received in a different name. In other words, the message received by the GW 30 is an access response MSG, while the message received by the BSC 20 is a QoS information MSG. Both of these two messages have user information and a QoS parameter field in common, so that the control flow-chart of FIG. 7 can be applied to the BSC 20 in the same manner as the GW 30.

An access response MSG processed as the procedure of FIG. 6 is transmitted to the GW 30. When the GW 30 receives the access response MSG (Step 700), it extracts user information from the access response MSG (Step 702). The GW 30 stores the extracted user information in an internal memory (not shown in FIG. 1) which is provided in the GW 30 (Step 704). Then, the GW 30 checks whether or not a QoS record is added to the received access response MSG (Step 706). As a result of checking, if the QoS record is added to the access response MSG, the GW 30 extracts information on types of services (Step 708). That is, the information is extracted, because information on the service type field 221 as shown in FIG. 2 is transmitted in addition to the access response MSG. The GW 30 stores the information on the service type field extracted in Step 708 at the internal memory Step (710). Subsequently, the GW 30 extracts a service QoS profile (Step 712). Here, the service QoS profile has values identical to QoS parameter values of {x, y, z, h, p, e, r} aforementioned in the description of the profile server 40. That is, the values of the service QoS profile becomes values of the service QoS profile 222 of FIG. 2. When this service QoS profile 222 is extracted, the GW 30 stores the service QoS profile 222 at the internal memory (Step 714). Then, the GW 30 checks whether or not the QoS record further exists (Step 716). As a result of checking, if the QoS record further exists, the GW 30 proceeds to Step 708. That is, the GW 30 performs the aforementioned extracting and storing procedures again. However, if the QoS record does not further exist, the GW 30 transmits the QoS information MSG to next node (Step 718). Here, the next node refers to the BSC 20. However, in the BSC 20, the next node refers to the BTS-a.

Further, Steps 700 to 716 are repeated at the BTS-a for the same procedure. However, in the BTS-a, the QoS information MSG is received as mentioned above and the received message is discarded in place of performing Step 718. That is, the BTS-a does not transmit the received message to the MS 1 again. This is because the message need not be transmitted to the MS 1.

Billing information is stored after services are performed. To be specific, billing data are stored using served details at a point when call is disconnected. Therefore, description will be made below regarding a procedure in which the call is disconnected.

Figure 8:
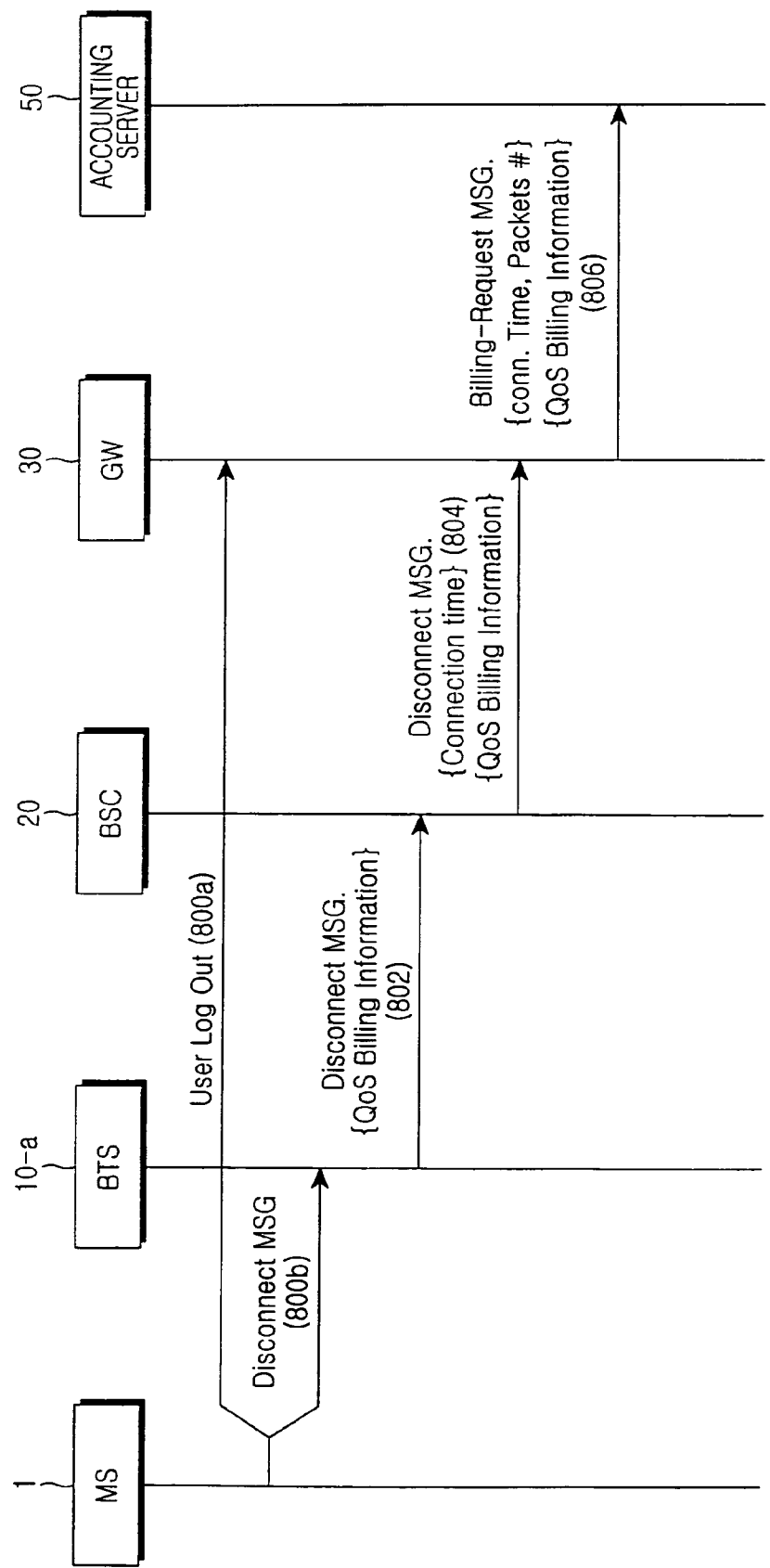
FIG. 8 is a signal flow diagram when a call is disconnected and then billing information is transmitted to an accounting server for supporting quality of service (QoS) based billing in accordance with the present invention

FIG. 8 is a signal flow diagram when a call is disconnected and then billing information is transmitted to an accounting server for supporting QoS based billing in accordance with the present invention. Hereinafter, a detailed description will be made with reference to FIG. 8 regarding a signal flow when billing information is transmitted to an accounting server for supporting QoS based billing in accordance with the present invention.

The MS 1 transmits both a user logout signal and a call disconnect MSG to the BTS-a, when a call is disconnected. With respect to this, Steps 800a and 800b is shown in FIG. 8. When the BTS-a receives the user logout signal together with the call disconnect MSG, the BTS-a transmits the user logout signal to the GW 30 through the BSC 20. This procedure allows the GW 30 to receive the user logout signal.

When the BTS-a receives the call disconnect MSG, the BTS-a transmits the received call disconnect MSG to the BSC 20 (Step 800a). Here, the BTS-a causes QoS billing information to be contained in the call disconnect MSG and then transmits the results to the BSC 20. The billing information includes time Scale of guaranteeing QoS during connection duration, the scale of not guaranteeing QoS during connection duration, profile of a data transfer rate (or average data transfer rate) for the time when QoS is guaranteed, profile of a data transfer rate (or average data transfer rate) for the time when QoS is not guaranteed, and profile of a physical channel rate during connection duration. This procedure allows the call disconnect MSG and QoS billing information to be transmitted from the BTS-a to the BSC 20. The BSC 20 performs an internal procedure for the call disconnect depending on the received call disconnect MSG and then transmits the call disconnect MSG to the GW 30 (Step 804). Here, the call disconnect MSG which is transmitted from the BSC 20 to the GW 30 contains a connection time when the MS 1 is provided with the QoS services as well as the QoS billing information received from the BTS-a. When the GW 30 receives the call disconnect MSG, the GW also performs an internal procedure for the call disconnect as the BSC 20 and then transmits a billing request MSG to the accounting server 50 (Step 806). This billing request MSG includes information on a connection time information on the number of transmitted packets and the QoS billing information. That is to say, when the GW 30 receives the call disconnect MSG with the number of transmitted packets stored in advance, the GW transmits the number of packets, the received connection time and QoS billing information to the accounting server 50.

Alternatively, when connection between the BTSs and the BSC or between the BSC and the GW is made with an IP network as mentioned in the description of FIG. 1, operation of each component may be different from that in the signal flow diagram. However, once information on billing mentioned in the signal flow diagram is transmitted to the accounting server, operation of each component can be performed under the same condition as the forgoing. For this reason, this will no longer described in detail.

Figure 9:
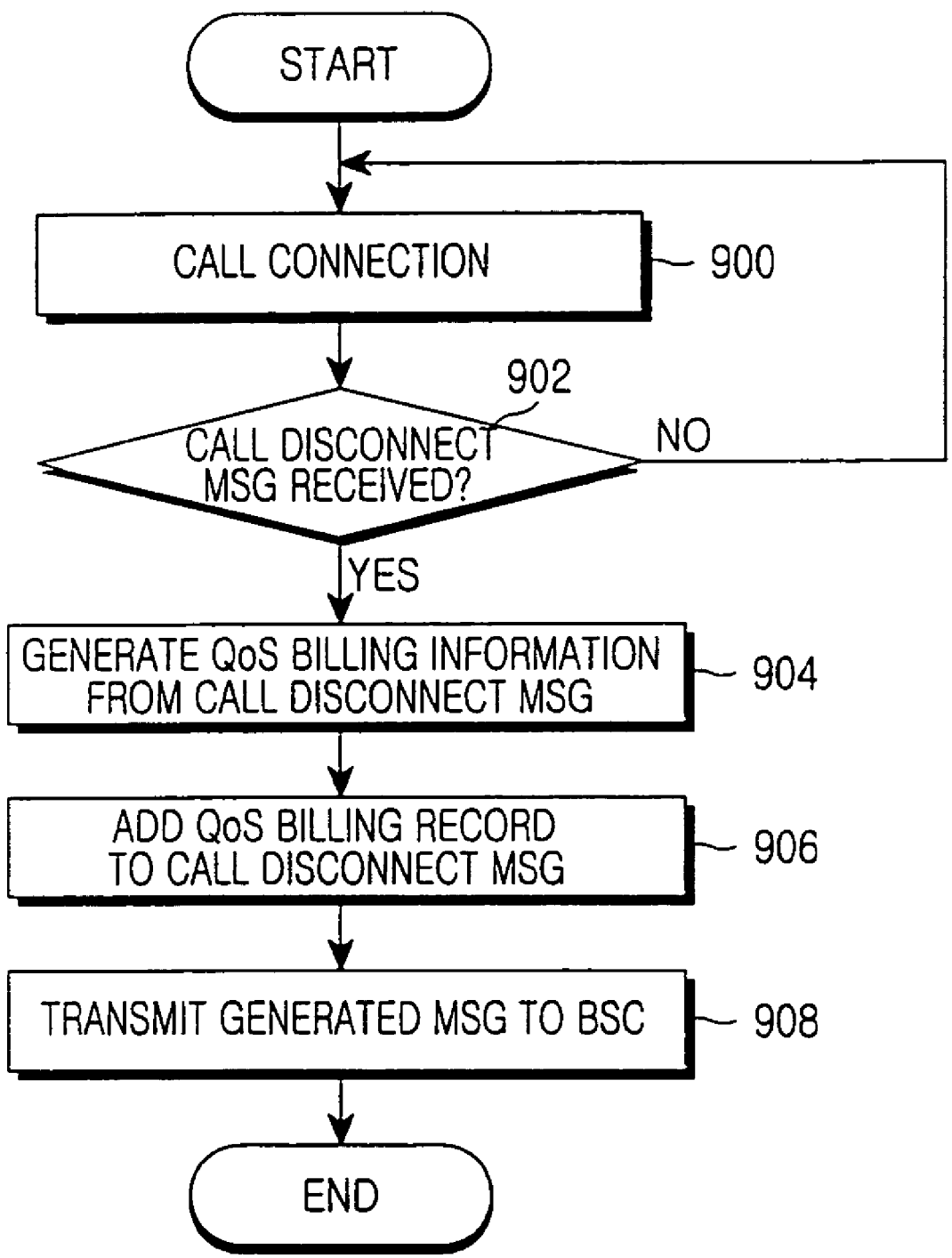
FIG. 9 is a control flow-chart for having control of transmission of billing information when a call disconnect MSG is received at a base transceiver system (BTS) according to a first preferred embodiment of the present invention.

FIG. 9 is a control flow-chart for having control of transmission of billing information when a call disconnect MSG is received at a BTS according to a first preferred embodiment of the present invention. Hereinafter, a detailed description will be made with reference to FIG. 9 regarding procedures for generating billing information and for controlling transmission of the generated billing information when the call disconnect MSG is received at the BTS.

The BTS-a is under the control of a call connection (Step 900). The BTS-a checks whether a call disconnect MSG is received (Step 902). This call disconnect MSG is transmitted from the MS 1 together with the user logout signal as reviewed in FIG. 8. As a result of checking, if the call disconnect MSG is received, the BTS-a proceeds to Step 904. If not so, the BTS-a continues to maintain the call connection. When Step 904 is performed after the call disconnect MSG is received in Step 902, the BTS-a creates the billing information from the received call disconnect MSG. The QoS billing information is billing information according to types of used services. In other words, served information is generated as the billing information. When creation of this QoS billing information is completed, the BTS-a adds QoS billing record to the call disconnect MSG (Step 906). Then, the BTS-a transmits the call disconnect MSG generated by addition of the QoS billing record to the BSC 20.

Figure 10:
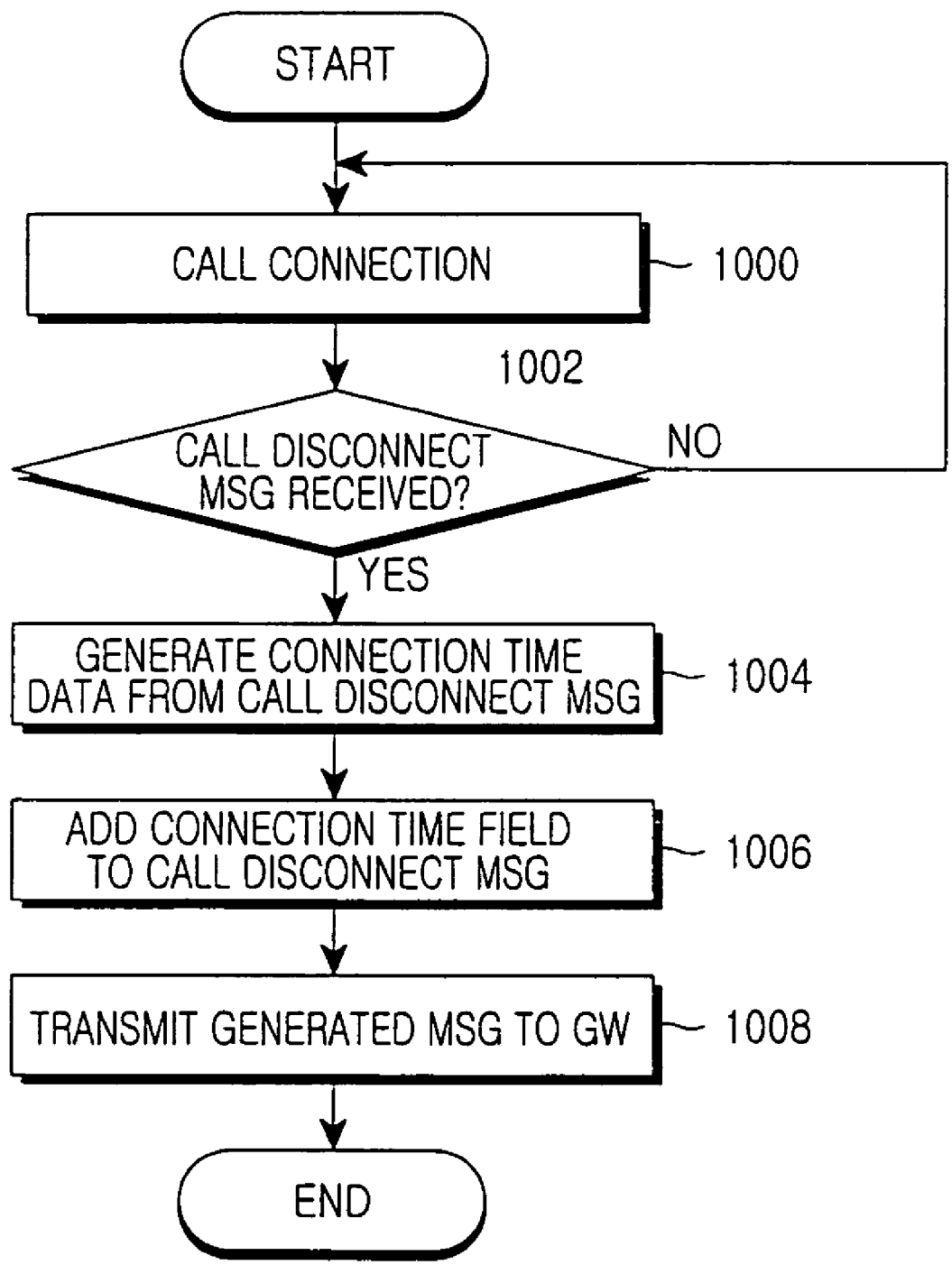
FIG. 10 is a control flow-chart for having control of creation and transmission of billing information when a call disconnect MSG is received at a BSC according to a first preferred embodiment of the present invention.

FIG. 10 is a control flow-chart for having control of creation and transmission of billing information when a call disconnect MSG is received at a BSC according to a first preferred embodiment of the present invention. Hereinafter, a detailed description will be made with reference to FIG. 10 regarding a control procedure for generating billing information and for transmitting the generated billing information when the call disconnect MSG is received at the BSC 20 according to the present invention.

The BSC 20 maintains a call connection because a call has been connected (Step 1000). The BSC checks whether a call disconnect MSG is received (Step 1002). As a result of checking, if the call disconnect MSG is received, the BSC proceeds to Step 1004. If not so, the BSC continues to maintain Step 1000. Further, the call disconnect MSG received from the BTS-a to the BSC 20 is message transmitted through the procedure mentioned in FIG. 9. Therefore, when services according to QoS are provided, the call disconnect MSG becomes a message to which a QoS billing, record is added. Because the present invention is disclosed for services according to QoS, description of FIG. 10 will be made on the assumption that services according to QoS are provided. When the BSC 20 proceeds from Step 1002 to Step 1004, the BSC 20 creates data for a call connection time of the MS 1 using time when the call disconnect MSG is received. That is, the BSC 20 calculates the call connection time between a call connection and a call disconnection. The BSC 20 adds a field of the call connection time calculated at Step 1004 to the received call disconnect MSG (Step 1006). Then, the BSC 20 transmits the call disconnect MSG, to which the connection the field and QoS billing information are added, to the GW 30.

Figure 11:
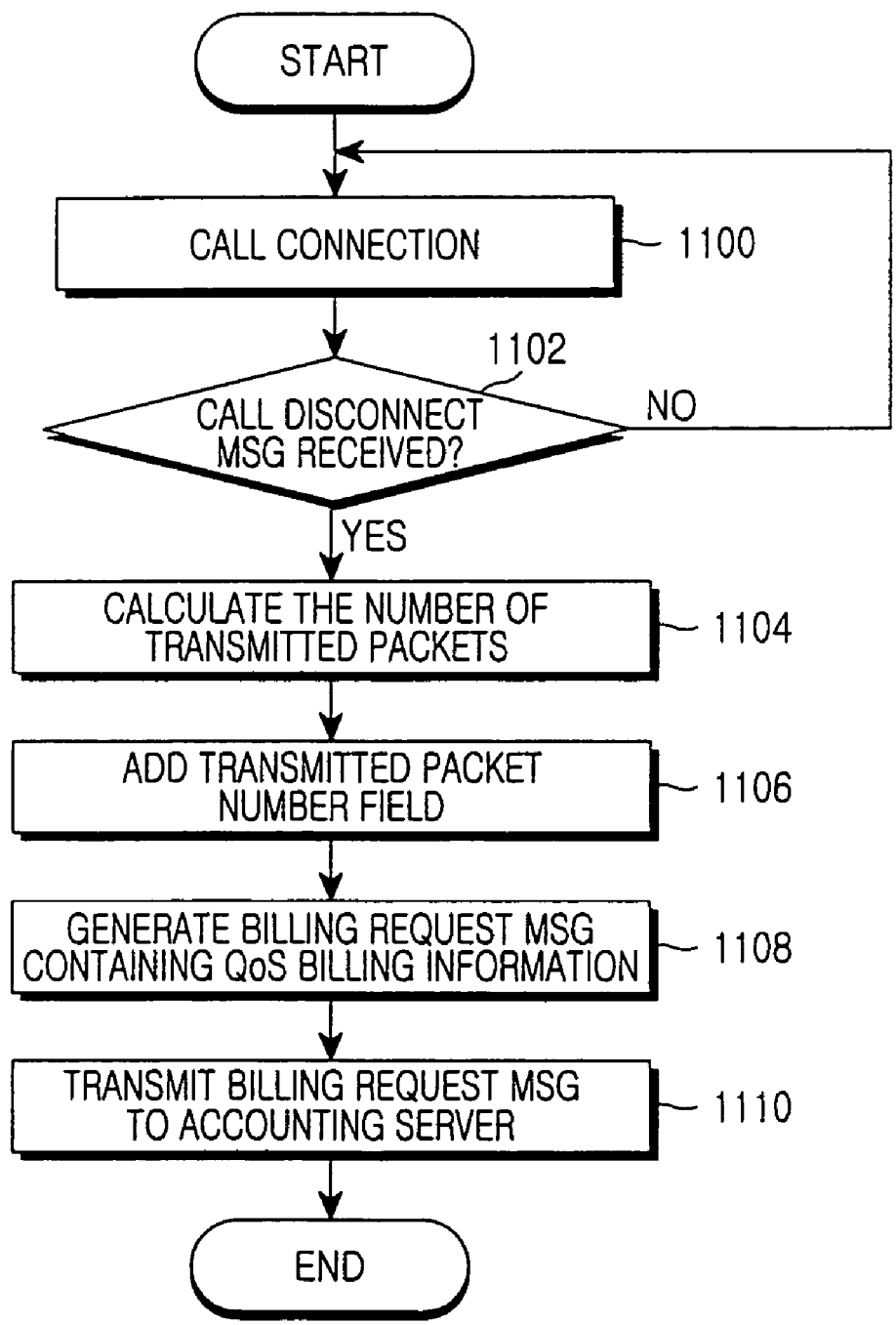
FIG. 11 is a control flow-chart when a call disconnect MSG is received at a GW according to a first preferred embodiment of the present invention.

FIG. 11 is a control flow-chart when a call disconnect MSG is received at a GW according to a first preferred embodiment of the present invention. A detailed description will be made regarding a control procedure for generating QoS billing information when the call disconnect MSG is received at the GW 30 and then for transmitting a billing request MSG to an accounting server 50 using the generated billing information in accordance with the present invention.

The GW 30 maintains a call connection (Step 1100). The GW checks whether a call disconnect MSG is received (Step 1102). Here, the received call disconnect MSG is one containing the QoS billing information according to types of provided services and connection time of provided services as described in FIG. 10. If this call disconnect MSG is received, the GW 30 proceeds to Step 1104. If not so, the GW continues to maintain the call connection of Step 1100. The GW 30 creates a billing request MSG for transmitting the QoS billing information according to types of provided services and connection time of provided services to the accounting server 50 and then calculates the number of transmitted packets (Step 1104). In other words, the GW 30 calculates the number of: packets transmitted to the MS 1 while services are provided to the MS 1 i.e., the call is connected. In addition, when a user logout signal is received and at the same time the call disconnect MSG is received, the number of packets transmitted to the MS 1 is calculated. Then, the GW 30 adds a field of the number of transmitted packets to the generated billing request MSG (Step 1106).

Subsequently, the GW 30 creates the billing request MSG containing the QoS billing information and the call connection time (Step 1108), and then transmits the billing request MSG to the accounting server 50 (Step 1110). That is, the QoS billing information generated at the BTS-a, the BSC 20 and the GW 30, data of connection time, information on the number of transmitted packets, and so forth, are transmitted to the accounting server 50.

Messages contained in the billing request MSG, which is generated at the GW 30 and then transmitted to the accounting server 50 as mentioned above, can be shown in table form below, which is represented as Table 4.

TABLE 4

| MSG type (Code) | Identifier | Length |
|---|---|---|
| Authentication information | | |
| Basic billing information {connection time} | | |
| Basic billing information {exchanged packet number} | | |
| QoS billing record #1 | | |
| ... | | |
| QoS billing record #N | | |

The messages of Table 4 includes various fields which are indicated by MSG type (Code), by identifier and by length of a MSG information field. Here are also included authentication information field for performing user authentication and basic billing information {connection time} and {exchanged packet number} fields. Further, the messages are transmitted, inclusive of QoS billing record.

Figure 12:
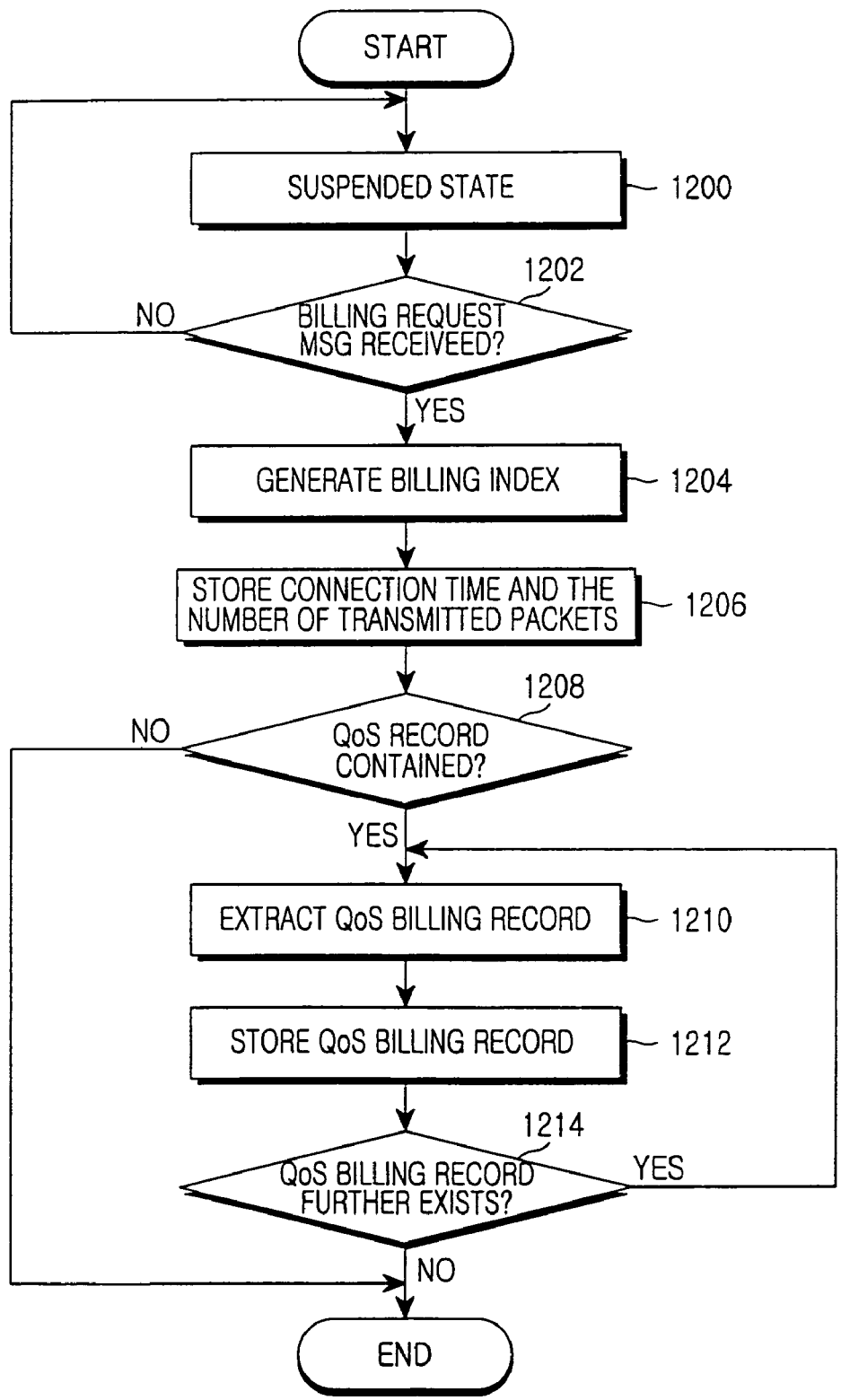
FIG. 12 is a control flow-chart when a billing request MSG is received at an accounting server according to a first preferred embodiment of the present invention.

FIG. 12 is a control flow-chart when a billing request MSG is received at an accounting server according to a first preferred embodiment of the present invention. Hereinafter, description will be made with reference to FIG. 12 regarding a control procedure performed when the billing request MSG is received at the accounting server 50 in accordance with the present invention.

The accounting server 50 maintains a suspended state (Step 1200). Here, the suspended state refers to a state of waiting reception or the billing request MSG from the GW 30 and of waiting input of various keys from an operator. Subsequently, the accounting server 50 checks whether or not the billing request MSG as shown in Table 4 is received from the GW 30 (Step 1202). As a result of checking, if the billing request MSG is received, the accounting server 50 proceeds to Step 1204. If not so, the accounting server maintains the suspended state. In Step 1204, the accounting server 50 creates a billing index. This billing index becomes an index for identifying each record. When the accounting server 50 creates the billing index, the accounting server stores information exchanged with a connection time, i.e., information on the number of served packets, as billing information (Step 1206). Then, the accounting server 50 checks whether QoS records are contained in the billing request MSG, i.e., whether QoS records as shown in Table 4 are contained (Step 1208). As a result of checking, if the QoS records are contained the accounting server 50 extracts the QoS records (Step 1210, and then stores the QoS records at the internal memory (not shown in FIG. 1) (Step 1212).

Meanwhile, the QoS records are stored with data such as the aforementioned QoS profile parameters. In addition, the QoS records are stored not only with various information, such as the number of packets which are provided as services as requested by the QoS parameters, the average transfer rate at which services are provided as requested by the QoS parameters, and so forth, but with other information, such as the number of packets which are not provided as services as requested by the QoS parameters, the average transfer rate at which services are not provided as requested by the QoS parameters, and so forth. These information are for performance of different billing according to information on packets which are normally provided as services and packets which are not so, when the billing, is performed in future.

After the QoS billing records are stored, the accounting server 50 checks whether or not those QoS billing records further exist (Step 1214). If the QoS billing records as shown in Table 4 exist two or more, the accounting server 50 proceeds to Step 1210. If not so, the accounting server 50 finishes the operation. Owing to Step 1214, the accounting server 50 can extract and store all the QoS billing records contained in the billing request MSG. Those QoS billing records is used as available data when service charge of the user is calculated at the accounting server 50 in future.

Figure 13:
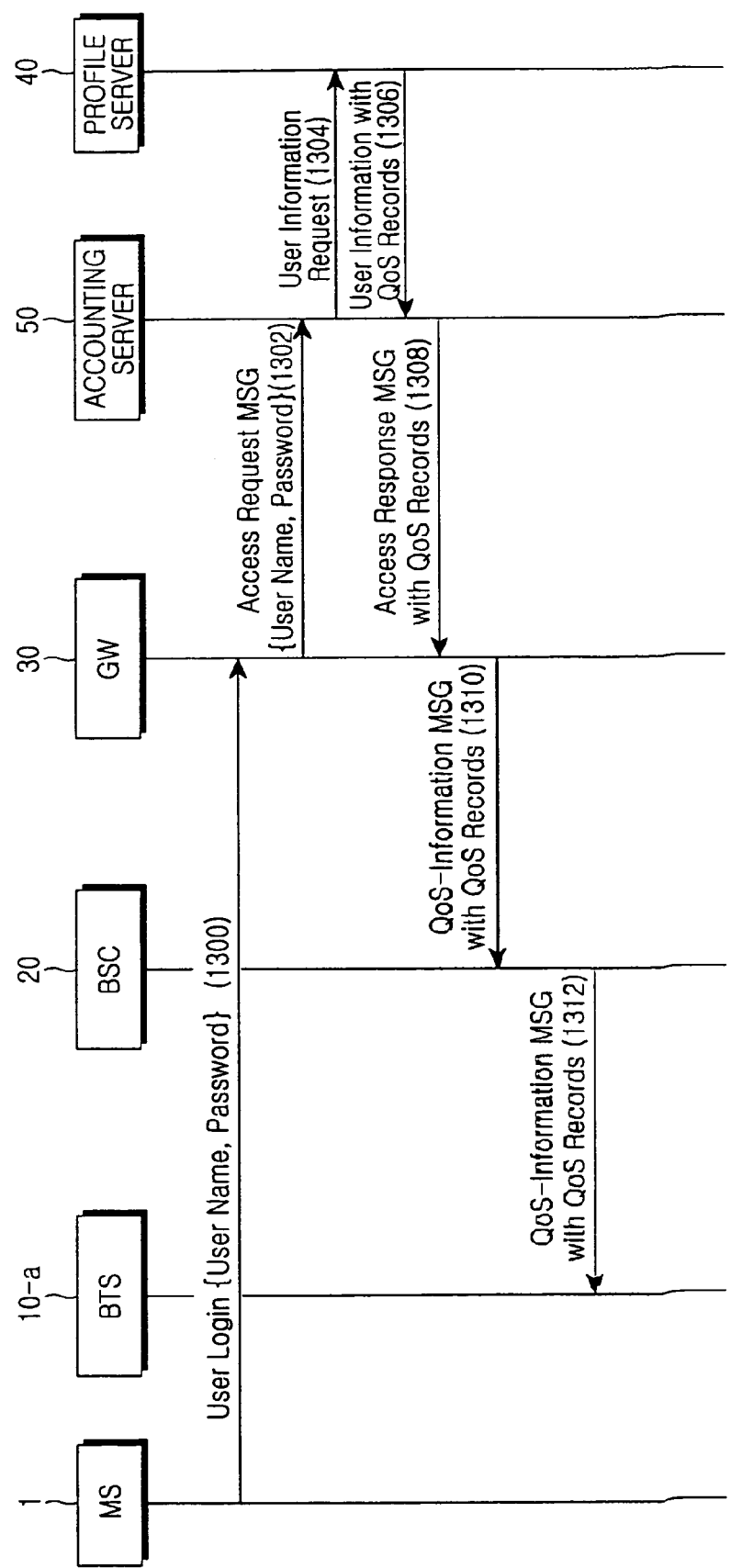
FIG. 13 is a signal flow diagram of a signalling procedure for service authentication when a call is set up in case that a profile server is incorporated either into an accounting server or in subordination to the accounting server according to a second embodiment of the present invention.

FIG. 13 is a signal flow diagram of a signaling procedure for service authentication when a call is set up, in case that a profile server is incorporated either into an accounting server or in subordination to the accounting server according to a second embodiment of the present invention. Description will be made below with reference to FIG. 13 regarding the signalling procedure when a profile server is incorporated either into an accounting server or in subordination to the accounting server according to a second embodiment of the present invention, as compared with that of FIG. 5.

A procedure for transmitting a user login signal is the same as that of FIG. 5. In FIG. 5, the GW 30 transmits the access request MSG to the profile server 40. However, in this embodiment, the GW 30 transmits the access request MSG to the accounting server 50, because the GW 30 is connectable to the profile server 40 through the accounting server 50. The access request MSG of FIG. 13 is also the same as that of FIG. 5. When the accounting server 50 receives the access request MSG, the accounting server requests user information from the profile server 40 using a user name and a password contained in the received access request MSG (Step 1304). When the user name is matched with the password, the profile server 40 transmits the requested user information inclusive of QoS parameters or the user to the accounting server 50 (Step 1306). Thus, the accounting server 50 performs Steps 1308 to 1312. Here, Step 1308 is the same as Step 504 of FIG. 5. Step 1310 is the same as Step 506 of FIG. 5, and Step 1312 is the same as Step 508 of FIG. 5. Therefore, description on these will be omitted.

Figure 14:
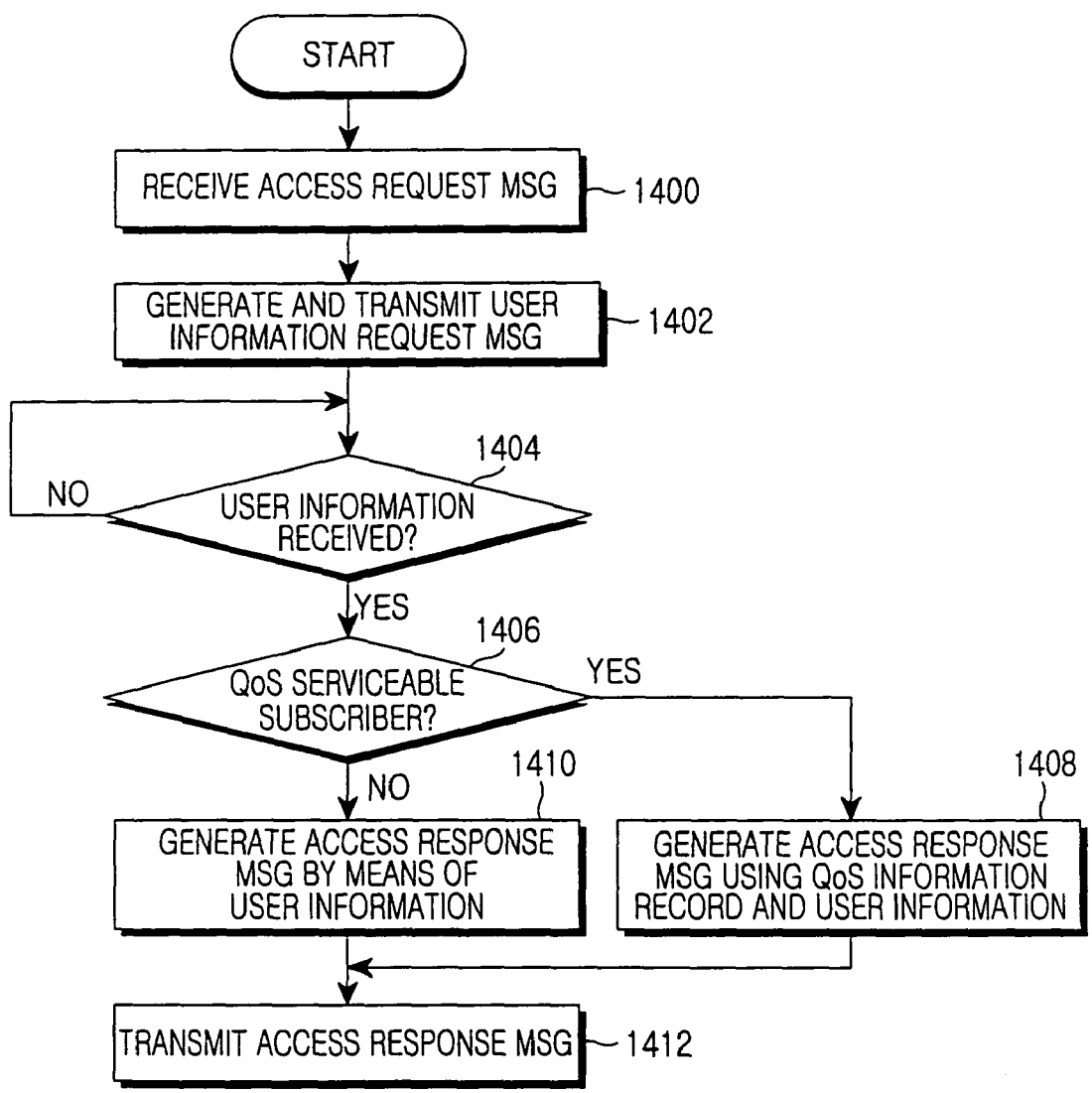
FIG. 14 is a control flow-chart when an access request MSG is received at an accounting server according to a second embodiment of the present invention.

FIG. 14 is a control flow-chart when an access request MSG is received at an accounting server, according to a second embodiment of the present invention. A detailed description will be made below with reference to FIG. 14 regarding a control procedure when an access request MSG is received at an accounting server according to the present invention.

When the accounting server 50 receives the access request MSG (Step 1400, the accounting server creates a user information request MSG using information contained in the access request MSG and transmits the generated user information request MSG to the profile server 40 (Step 1402). Subsequently, the accounting server 50 checks whether user information is received from the profile server 40 (Step 1404). In general, even when authentication is unacceptable, i.e., even when a user name is not matched with a password, the profile server 40 may transmit an authentication unacceptable MSG. However, the embodiment of FIG. 14 has no consideration for the case that the authentication is unacceptable. Therefore, description will be made regarding reception of the user information on the assumption that the authentication is acceptable. As a result of checking in Step 1404, if the user information is received, the accounting server 50 proceeds to Step 1406. If not so, the accounting, server 50 continues to perform Step 1404.

In Step 1406, the accounting server 50 checks whether or not the user information received from the profile server 40 is matched with a QoS serviceable subscriber, i.e., a subscriber to whom services according to QoS can be provided. As a result of checking, the accounting server 50 detects as a QoS serviceable subscriber it information containing QoS parameters together with an authentication acceptable signal is received from the profile server 40, and otherwise as a general subscriber or QoS unserviceable subscriber. Therefore, for the QoS serviceable subscriber, the accounting server 50 proceeds to Step 1408, while for the QoS unserviceable subscriber, the accounting server 50 proceeds to Step 1410. In Step 1408, the accounting server 50 creates an access response MSG using the QoS information records and user information, and then proceeds to Step 1412. Here, the generated access response MSG can be represented as shown in Table 3.

Unlike to the foregoing, when proceeding from Step 1406 to Step 1410, the accounting server 50 creates the access response MSG using the user information. This access response MSC generated through user information in Step 1410 becomes the access response MSG which is generally used in the prior art.

As mentioned above, when the access response MSG is generated in Step 1410 or 1408, the accounting server 50 transmits the generated access response MSG to the GW 30 (Step 1412).

Even with this construction, authentication is checked at the profile server 40 in the same manner. However, there is a difference in that the profile server 40 does neither receive the access request MSG directly or create the access response MSG directly. Alternatively, the profile server 40 may do so directly. This is only an alternative for system designers.

As can seen from the foregoing, with management of the QoS profile and the QoS billing information proposed by the present invention, it is possible to store and transmit the QoS information and the QoS billing information in the mobile communication system.

While the invention has been shown and described with reference to certain preferred embodiments thereof, it will be understood by one skilled in the art that various modifications may be made therein without departing from the spirit and scope of the invention as defined by the appended claims. Therefore, the present invention should not be limited to the disclosed embodiments.

What is claimed is:

1. A method for providing services to at least one mobile station (MS) according to quality of service (QoS) in a mobile communication system, in which the mobile communication system includes the MS, at least one base transceiver system (BTS) and a profile server for storing QoS profile information of the MS, the method comprising the steps of:

storing in the profile server, identifier information indicating a user of the MS and QoS profiles of each service which can be provided to the MS together with the identifier information;

transmitting the QoS profiles of the MS to the BTS in a single message and providing each service according to the QoS profiles; and generating QoS billing information based on the stored QoS profiles and the stored identifier information;

wherein the QoS profiles comprise a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

2. A method according to claim 1, wherein the profile server provides the QoS profiles of the MS to the BTS when information on the MS is requested from the BTS.

3. A method according to claim 1, wherein the QoS profile information includes information on types of services for providing to the MS and QoS parameters of the services.

4. A method according to claim 3, wherein the QoS parameters include a minimal amount of information which is transferable to a service to be provided for a predetermined time, a period providing predetermined information to services to be provided, and a maximal amount of information which is transferable to a service to be provided for a predetermined time.

5. A method according to claim 4, wherein the QoS parameters further comprise a handoff mode of a service to be provided, a processing mode when it is impossible to support a service to be provided, information on whether or not preemption of low-level QoS is rendered when it is impossible to support a service to be provided, and a priority of a service to be provided.

6. A method for performing billing and for storing billing information with respect to services provided to at least one mobile station (MS) according to quality, of service (QoS) profiles in a service system, in which the service system comprises the MS, at least one base transceiver system (BTS) capable of providing the services to the MS with a quality of service (QoS) differentiated, a base station controller (BSC) connected with the BTS, a gateway (GW) connected with the BSC, an accounting server connected with the GW and storing the billing information depending on the services provided to the MS and performing billing calculation, the method comprising the steps of:

generating a first call disconnect message (MSG) containing QoS billing information provided to the MS when the BTS receives the first call disconnect MSG from the MS which is provided with the services according to the QoS profiles, and to transmit the first call disconnect MSG to the BSC;

generating a second call disconnect MSG which further contains a call connection time of the MS and to transmit the second call disconnect MSG to the GW;

generating a billing request MSG containing the QoS billing information provided to the MS, the call connection time provided with the services and the number of packets provided to the MS, and to transmit the generated billing request MSG to the accounting server; and storing information needed for performing the billing and to perform the billing according to the QoS profiles;

wherein the QoS profiles are contained in a single billing request MSG and are provided for each service; and, wherein the stored information is information according to the QoS profiles, in which the QoS profiles are a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

7. A method according to claim 6, wherein the information stored at the accounting server is information on service contents according to the QoS, and on an identifier of the MS.

8. A method for performing billing of services provided from at least one base transceiver system (BTS) in a mobile communication system, comprising the steps of:

generating login data when the MS receives a service request signal having quality of service (QoS) parameters and requesting information on a QoS profile having the QoS parameters of the MS from a base station controller (BSC);

providing services requested from the MS according to the QoS parameters of the QoS profile when the information on the QoS profile of the MS is received; and generating a call disconnect message (MSG) containing QoS billing information provided to the MS when the call disconnect MSG is received from the MS and transmitting the generated call disconnect MSG to the BSC, wherein the QoS profiles are contained in one billing request MSG and are provided for each service; and wherein the QoS profiles comprise a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

9. A method according to claim 8, wherein the QoS billing information includes a time scale of guaranteeing QoS during connection duration, a time scale of not guaranteeing QoS during connection duration, a profile of a data transfer rate for the time when QoS is guaranteed, a profile of a data transfer rate for the time when QoS is not guaranteed, and a profile of a physical channel rate during connection duration.

10. A method for performing billing of services according to quality of service (QoS) from at least one base station controller (BSC) in a mobile communication system, comprising the steps of:

transmitting a request for a QoS information of at least one mobile station (MS) to a gateway (GW) when the request is received from the BTS;

extracting and storing a QoS profile contained in the QoS information when a QoS information message (MSG) of the MS is received from the GW;

transmitting the received QoS information MSG of the MS to the BTS; and adding information of a call connection time of the MS to a call disconnect MSG when the call disconnect MSG is received from the BTS and transmitting the added information to the GW, wherein the QoS profiles are contained in one QoS information message and are provided for each service; and wherein the QoS profiles comprises a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

11. A method for performing billing of services according to quality of service (QoS) from a gateway (GW) in a mobile communication system, comprising the steps of:

generating an access request message (MSG) of at least one mobile station (MS) when a request for QoS profile information of the MS is received from a base station controller (BSC) and transmitting the generated access request MSG to a profile server;

extracting the QoS profile contained in QoS information of the MS when an access response MSG containing the QoS information of the MS is received from the profile server;

generating a QoS information MSG using the QoS information of the MS and transmitting the generated QoS information MSG to the BSC; and generating a billing request MSG when a call disconnect MSG is received from the BSC, inclusive of QoS billing information contained in the call disconnect MSG and of the number of transmitted packets, and transmitting the generated billing request MSG to an accounting server, wherein the QoS profiles are contained in one access response MSG and are provided for each service; and wherein the QoS profiles comprises a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

12. A method according to claim 11, wherein the information stored at the accounting server is information on service contents according to the QoS, and on an identifier of the MS.

13. A method according to claim 11, wherein the service contents according to the QoS are a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

14. A method for providing services and for performing billing of services according to quality of service (QoS) from an accounting server in a mobile communication system, comprising the steps of:

requesting information of at least one mobile station (MS) from a profile server when the information of the MS is requested from a base transceiver system (BTS) which is capable of providing services to the MS;

generating an access response message (MSG) using a QoS profile of the MS when the QoS profile of the MS is received from the profile server, and transmitting the generated access response MSG to the BTS so as to provide services requested by the MS; and generating QoS billing information based on the stored QoS profiles and the stored identifier information;

wherein the QoS profiles are contained in one access response MSG and are provided for each service; and wherein the QoS profiles comprises at least one of a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

15. A method according to claim 14, further comprising the step of extracting billing records contained in the billing request MSG when the billing request MSG is received from the GW to generate and store billing information of the MS.

16. A method according to claim 15, wherein the stored billing information is information on service contents according to the QoS, and on an identifier of the MS.

17. A method according to claim 16, wherein the service contents according to the QoS are a time scale of guaranteeing QoS during providing the services, a time scale of not guaranteeing QoS during providing the services, a profile of a data transfer rate for the time when QoS is guaranteed, a profile of a data transfer rate for the time when QoS is not guaranteed, and a profile of a physical channel rate during connection duration.

* * * * *